United States Patent
Eliáš et al.

(10) Patent No.: US 10,303,531 B2
(45) Date of Patent: May 28, 2019

(54) CONSOLE APPLICATION THROUGH WEB SERVICE

(71) Applicant: Red Hat, Inc., Raleigh, NC (US)

(72) Inventors: Filip Eliáš, Brno (CZ); Filip Nguyen, Brno (CZ)

(73) Assignee: RED HAT, INC., Raleigh, NC (US)

( * ) Notice: Subject to any disclaimer, the term of this patent is extended or adjusted under 35 U.S.C. 154(b) by 425 days.

(21) Appl. No.: 14/444,817

(22) Filed: Jul. 28, 2014

(65) Prior Publication Data

US 2016/0026447 A1 Jan. 28, 2016

(51) Int. Cl.
| | |
|---|---|
| G06F 9/445 | (2018.01) |
| H04L 29/06 | (2006.01) |
| H04L 29/08 | (2006.01) |
| G06F 9/54 | (2006.01) |
| G06F 9/455 | (2018.01) |

(52) U.S. Cl.
CPC .......... G06F 9/547 (2013.01); G06F 9/45512 (2013.01); H04L 67/34 (2013.01); *G06F 2209/542* (2013.01)

(58) Field of Classification Search
CPC .......... G06F 8/60; G06F 9/45512; G06F 9/50; G06F 9/445; H04L 67/34; H04L 29/06; H04L 29/08
USPC ........................................................ 709/219
See application file for complete search history.

(56) References Cited

U.S. PATENT DOCUMENTS

| | | | |
|---|---|---|---|
| 5,283,861 A | 2/1994 | Dangler et al. | |
| 5,999,525 A * | 12/1999 | Krishnaswamy | ... H04L 12/1818 370/352 |
| 6,157,953 A * | 12/2000 | Chang | ..... H04L 29/06 709/225 |
| 6,219,700 B1 * | 4/2001 | Chang | ..... H04L 41/044 709/222 |
| 6,335,927 B1 * | 1/2002 | Elliott | ..... H04L 12/14 370/352 |
| 6,393,569 B1 | 5/2002 | Orenshteyn | |
| 6,546,425 B1 * | 4/2003 | Hanson | ..... H04L 1/188 709/227 |
| 6,622,302 B1 * | 9/2003 | Delaney | ..... G06F 8/65 717/168 |
| 6,731,625 B1 * | 5/2004 | Eastep | ..... H04L 29/06 370/352 |
| 6,909,708 B1 * | 6/2005 | Krishnaswamy | ... H04L 12/1813 370/352 |
| 7,143,419 B2 | 11/2006 | Fischer et al. | |

(Continued)

OTHER PUBLICATIONS https://web.archive.org/web/20140425055906/http://byteman.jboss.org/.*

(Continued)

*Primary Examiner* — Kostas J Katsikis
(74) *Attorney, Agent, or Firm* — Haynes and Boone LLP

(57) ABSTRACT

A method performed by a server computing system includes generating an operation for a web service, the operation corresponding to at least one main method of a console application, receiving input data from a client device through the operation, writing the input data to a memory store, executing the console application using the input data of the memory store, injecting code into the console application, the code to change input/output streams from a console input/output to the memory store. The method further includes writing an output of the console application to the memory store.

20 Claims, 5 Drawing Sheets

(56) References Cited

U.S. PATENT DOCUMENTS

| | | | |
|---|---|---|---|
| 7,587,459 B2 | 9/2009 | Wewalaarachchi et al. | |
| 8,260,845 B1* | 9/2012 | Colton | G06F 8/30 |
| | | | 709/202 |
| 8,556,713 B2 | 10/2013 | Pilip | |
| 9,648,068 B1* | 5/2017 | Narsude | H04L 65/60 |
| 2002/0173984 A1* | 11/2002 | Robertson | G06Q 10/10 |
| | | | 709/220 |
| 2003/0163448 A1* | 8/2003 | Kilemba | G06F 9/45512 |
| 2004/0040016 A1* | 2/2004 | Pearce | G06F 8/30 |
| | | | 717/141 |
| 2004/0041833 A1* | 3/2004 | Dikhit | H04L 41/12 |
| | | | 715/738 |
| 2004/0073708 A1* | 4/2004 | Warnock | G06F 17/2247 |
| | | | 709/246 |
| 2004/0103220 A1* | 5/2004 | Bostick | H04L 41/00 |
| | | | 709/253 |
| 2008/0109683 A1* | 5/2008 | Erwin | G06F 11/0709 |
| | | | 714/46 |
| 2008/0209316 A1 | 8/2008 | Zandstra | |
| 2008/0229276 A1* | 9/2008 | Koehler | G06F 8/35 |
| | | | 717/104 |
| 2009/0287729 A1* | 11/2009 | Chen | G06F 11/3676 |
| 2010/0125872 A1* | 5/2010 | Crow | G06Q 30/02 |
| | | | 725/35 |
| 2011/0138365 A1* | 6/2011 | Schmelter | G06F 11/3404 |
| | | | 717/130 |
| 2011/0213480 A1* | 9/2011 | Zila | G06F 17/5004 |
| | | | 700/98 |
| 2011/0296373 A1* | 12/2011 | Calev | G06F 8/38 |
| | | | 717/104 |
| 2012/0084798 A1* | 4/2012 | Reeves | H04L 67/1095 |
| | | | 719/319 |
| 2013/0073615 A1* | 3/2013 | Hall | H04L 67/306 |
| | | | 709/203 |
| 2013/0117733 A1* | 5/2013 | Ahmed | G06F 8/30 |
| | | | 717/140 |
| 2015/0135167 A1* | 5/2015 | Berk | G06F 11/3644 |
| | | | 717/128 |
| 2015/0347272 A1* | 12/2015 | Berk | G06F 11/3644 |
| | | | 717/128 |

OTHER PUBLICATIONS

"*Convert a Java Console Program to Webapp*" http://stackoverflow.com/questions/10108581/convert-a-java-console-program-to-webapp=.

"*Web Enabling Java Console Application's JMX Beans*" http://stackoverflow.com/questions/3283248/web-enabling-java-console-applications-jmx-beans.

"*Jminix a Simple Embeddable Restful JMX Console*" https://code.google.com/p/jminix/.

"*A Java SE App to be Moved to a Java EE Server*" http://stackoverflow.com/questions/19880146/a-java-se-app-to-be-moved-to-a-java-ee-server.

LaPlant et al. "*The Universal Remote Console: A Universal Access Bus for Pervasive Computing*" Jan.-Mar. 2004, IEEE CS and IEEE ComSoc.

\* cited by examiner

CONSOLE APPLICATION THROUGH WEB SERVICE

BACKGROUND

The present disclosure relates generally to software applications, and more particularly to methods and systems for efficiently providing console applications to remote users.

A console application is a software application, or smaller component of a software application, that does not include a graphical user interface component. Rather, users or other programs typically interact with a console application through a command line. For example, users may execute the console application by typing the name of the executable file associated with the console application into a command line. Console applications are quite common and may be written in a variety of different computer programming languages such as Java.

Console applications may be used for a variety of purposes. In some cases, console applications are utilized by automated scripts. In some cases, legacy console applications are used in cooperation with newer software applications that do include graphical user interface components. In general, it can be a time consuming and costly task to convert console applications into a form such that users can interact with the console application remotely. Providing console applications to remote users may involve reworking of code and other costly and time consuming tasks.

SUMMARY

According to one example, a method performed by a server computing system includes generating an operation for a web service, the operation corresponding to at least one main method of a console application, receiving input data from a client device through the operation, writing the input data to a memory store, executing the console application using the input data of the memory store, injecting code into the console application, the code to change input/output streams from a console input/output to the memory store. The method further includes writing an output of the console application to the memory store.

According to one example, a system includes an application server that includes a deployer module to analyze a console application for a main method and deploy a web service, the web service comprising an operation corresponding to the main method, a web service module to provide the web service to a client device, and an injection module to inject code into the console application in response to the console application being called by the operation, the code to change input/output streams from a console input/output to a memory store.

According to one example, a computer program product stored on a non-transitory computer readable medium, the computer program product comprising machine readable instructions, the machine readable instructions including code to receive input data from a client device, the input data comprising a first input parameter and a second input parameter, code to store the first input parameter and the second input parameter to an input portion of a memory store, code to create an output portion of the memory store, code to create an injection rule for a main method of a console application, the injection rule to change console input to the input portion of the memory store and to change the console output to the output portion of the memory store, code to execute the console application, and code to provide data stored in the output portion of the memory store to the client.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, converting a console application into a format such that the console application can be provided to remote users can be a time consuming task. According to principles described herein, a console application is efficiently converted into a web service such that users can interact with the console application remotely. In one example, a console application is deployed on an application server. A web service can be used as an interface between remote client systems and the console application on the application server. The application server can utilize various tools to inject code into the console application during runtime in order to change the input and output streams such that they can be used by the web service. The application can be made available over a network such as the Internet through a variety of protocols such as Simple Object Access Protocol (SOAP). Furthermore, the console application can be provided to multiple users simultaneously as each user interacts with a different instance of the console application. The following discussion provides further detail regarding how the console application is automatically converted into a web service and provided to client systems over a network.

Figure 1:
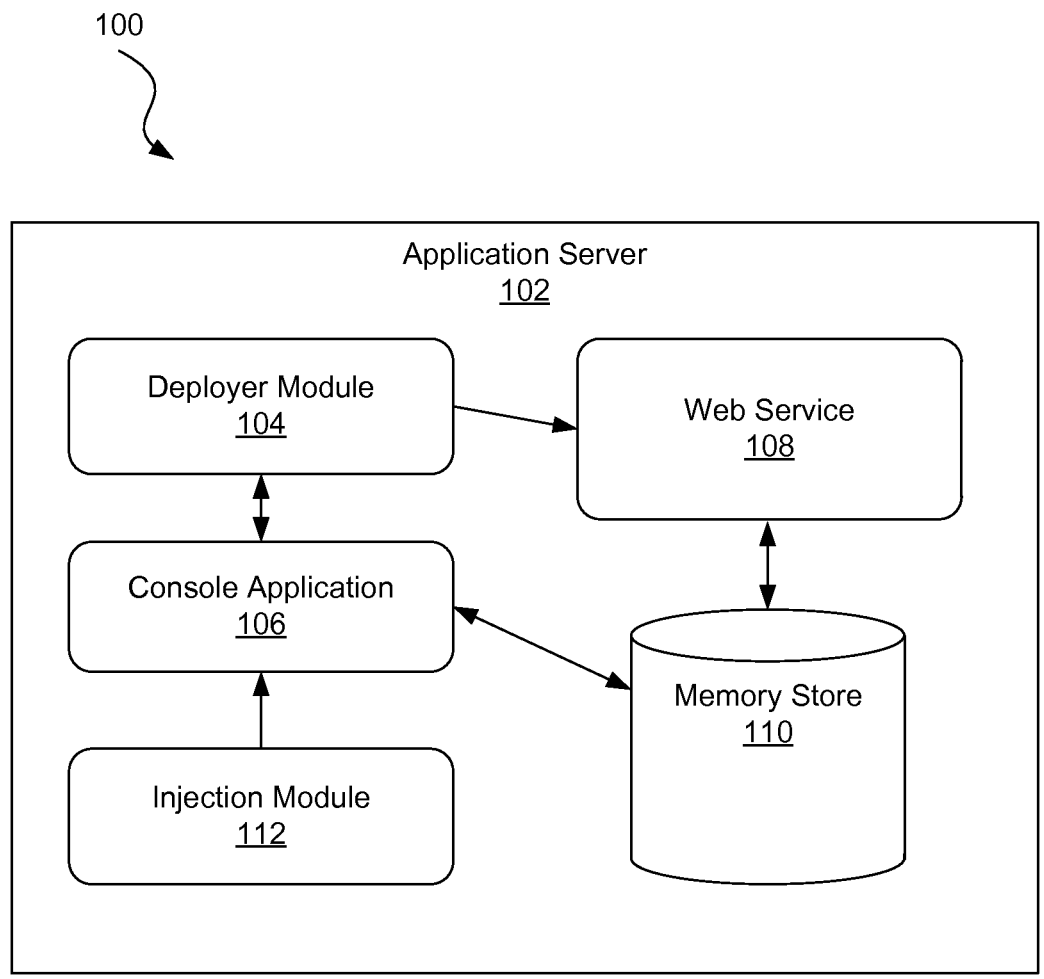
FIG. 1 is a diagram showing an illustrative application server that provides console applications to remote users, according to one example of principles described herein.

FIG. 1 is a diagram showing 100 an illustrative application server 102 that provides console applications to remote systems and thus remote users. According to the present example, the application server 102 includes a deployer module 104, a web service 108, a console application 106, an injection module 112, and a memory store 110.

The deployer module 104 is used to deploy the web service 108 based on the console application 106. According to one example, the application server 102 creates an instance of the console application for each remote system that requests use of the console application 106. Each instance of the console application 106 is associated the web service 108.

In one example, the deployer module 104 performs several steps to deploy the web service 108. First, the deployer module 104 analyzes the console application 106 to find all the main methods. For example, in Java, each executable application includes at least one main method in the source code. Various techniques can be used to find the main methods. For example, the java Application Programming Interface (API) can include a reflection function that allows for examination of a software application. The Java reflection function can be used to find the main methods of a particular console application.

For each main method found in the console application 106, the deployer module 104 creates an operation for the web service 108. The operation of the web service 108 includes two input parameters. The first input parameter corresponds to command line arguments. A command line argument is a value that is typically typed along with the name of the executable file associated with the console application. Command line arguments allow users to pass information into the application as the application is first executed. The second input parameter corresponds to a set of user inputs associated with the console application 106. In general, console applications typically request information from a user during runtime. Additionally, console applications typically output information to a user. The output associated with the console application 106 corresponds to an output string that is to be made available to the operation of the web service 108. In some examples, the name of an operation corresponds to the name of the main method package and class name. For example, if the main method is found in the class acme.test.MyApplication, then the operation name can be acme_test_MyApplication.

The operation of the web service includes the functionality to present to a user, a mechanism for receiving input data, as well as a mechanism for presenting the output data to the user. Additionally, the operation includes the functionality to provide output data to a user. In some examples, the operation includes a graphical user interface component of the web service. For example, the operation may cause the web service to display two input fields to a user, each input field corresponding to the two input parameters. The operation also includes the functionality to store data received through the input fields to a location within the memory store 110. The operation may be embodied as machine readable code that when executed by the application server 102, causes the server 102 to perform the functions described above.

The deployer module also creates space in a memory store 110 for use by the web service 108. For example, a particular region of memory may be designated for use by the web service 108 and the corresponding console application 106. The particular memory region may include sub-regions that correspond to specific instances of the console application 106 for specific users. Such sub-regions may remain allocated for a particular instance as long as that instance exists.

The console application 106 may be used to perform a variety of computing tasks on behalf of a user. Any type of console application that can be deployed to a web service 108 can be used in accordance with principles described herein. In one example, the console application 106 is stored on the application server 102 in a Java ARchive (JAR) format. The JAR format is a package file format that aggregates several java class files. A JAR file may include metadata and other resources such as text, images, sounds, etc. When an operation of the web service 108 calls the console application 106, the application server 102 executes an instance of the console application 106 using the information contained within the stored JAR file.

The injection module 112 is used to make changes to the source code of the console application 106 during runtime. Specifically, the injection module 112 is used to change the input and output streams of the console application 106. Console applications generally include input and output streams to and from the console, which corresponds to the command prompt. For example, a console application may have an output stream to the command line. The injection module 112 can change the output streams to a particular memory location such as a file stored in memory. The memory location is also made accessible by the web service 108.

Various techniques can be used to inject code during runtime in order to change the input and output streams of the console application. In one example, a code testing agent such as Byteman may be used. Byteman is a program that injects code and is often used for testing purposes. Byteman uses rules to determine when and where code should be injected. In one example, the injection module 112 can use the following rule.

```
RULE streams main entry
CLASS test.Main
METHOD main
AT ENTRY
IF true
DO System.setIn(new java.io.CustomFileInputStream(new
java.io.File(".../input_id123.txt")));
    System.setOut(new java.io.CustomPrintStream(new
    java.io.File(".../output_id123.txt")));
ENDRULE
RULE in entry
CLASS java.lang.System
METHOD setIn
AT ENTRY
IF System.in.getClass( ).getName( ).equals ("CustomFileInputStream")
DO
return;
ENDRULE
RULE out entry
CLASS java.lang.System
METHOD setOut
AT ENTRY
IF System.out.getClass( ).getName( ).equals ("CustomPrintStream")
DO
return;
ENDRULE
```

The above rule replaces the console input and output streams with two different files, particularly, input_id123.txt and output_id123.txt. The file names may include an identification number that identifies a particular instance of the console application 106. Thus, the web service 108 can identify where input and output for a particular console application 106 instance is found.

The memory store 110 to which the console input and output streams are switched may be one of many types of memory. In one example, the memory store 110 is a non-volatile memory store and the input and output streams correspond to files. In one example, the memory store 110 is a volatile memory store such as Random Access Memory. Other locations to which the input and output streams can be switched are contemplated as well, such as to an external database.

Figure 2:
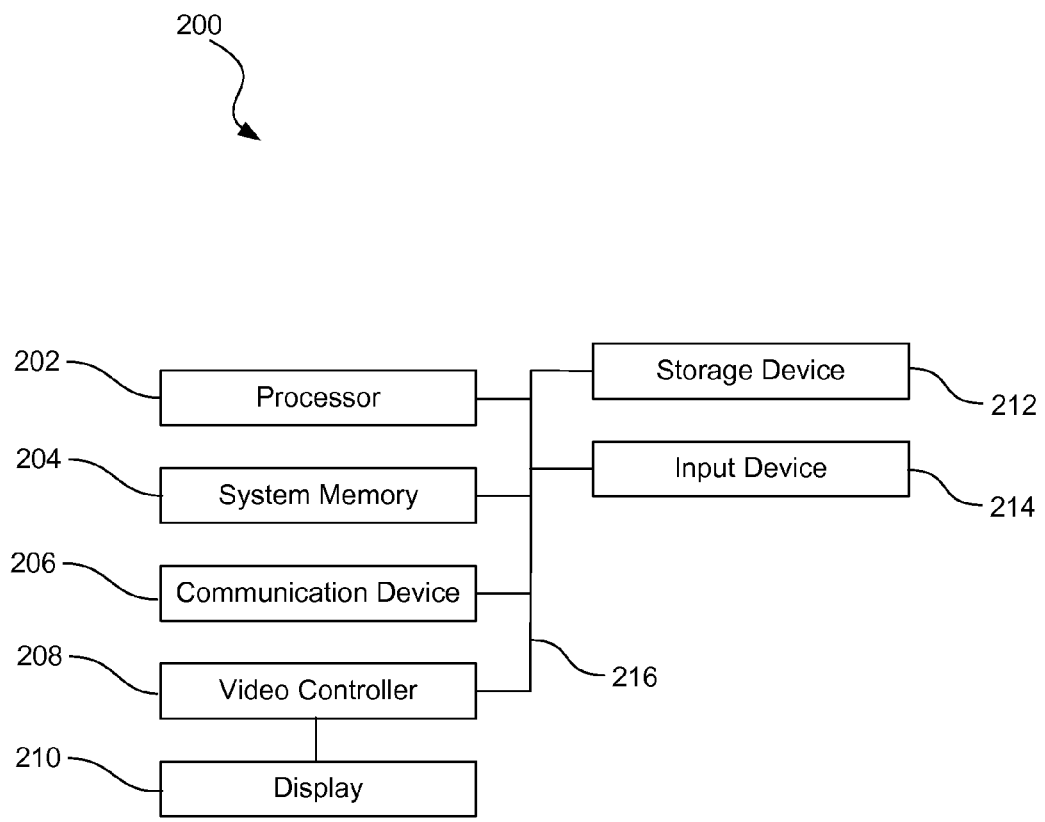
FIG. 2 is a diagram showing an illustrative computing system that may provide console applications to remote users, according to one example of principles described herein.

FIG. 2 is a diagram showing an illustrative computing system 200 that may be used to perform the functions of the application server (e.g. 102, FIG. 1). According to the present example, the computing system 200 includes a processor 202, an input device 214, a storage device 212, a video controller 208, a system memory 204, a display 210, and a communication device 206, all of which are interconnected by one or more buses 216.

In some examples, the storage device 212 may include a floppy drive, hard drive, CD-ROM, optical drive, any other form of storage device and/or any combination thereof. In several exemplary embodiments, the storage device 212 may include, and/or be capable of receiving, a floppy disk, CD-ROM, DVD-ROM, or any other form of computer readable medium that may contain executable instructions. In one example, the computer readable medium is a non-transitory tangible media.

In some examples, the communication device 206 may include a modem, network card, or any other device to enable the computing system 200 to communicate with other computing devices. In some examples, any computing device represents a plurality of interconnected (whether by intranet or Internet) computer systems, including without limitation, personal computers, mainframes, smartphones, tablets, and cell phones.

In some examples, a computer system typically includes at least hardware capable of executing machine readable instructions, as well as the software for executing acts (typically machine-readable instructions) that produce a desired result. In some examples, a computer system may include hybrids of hardware and software, as well as computer sub-systems.

In some examples, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into a silicon chip. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 204, and/or any combination thereof, may be executed by a processor 202 to cause the processor 202 to carry out or implement in whole or in part the operation of the system 200, one or more of the methods. In some examples, such a processor 202 may execute the plurality of instructions in connection with a virtual computer system.

The computing system 200 may perform the function of any of the components described in FIG. 1. For example, the computing system 200 may process instructions for the web service, the injection module, or the deployer. The computing system 200 may also be a client device that interacts with the application server.

Figure 3:
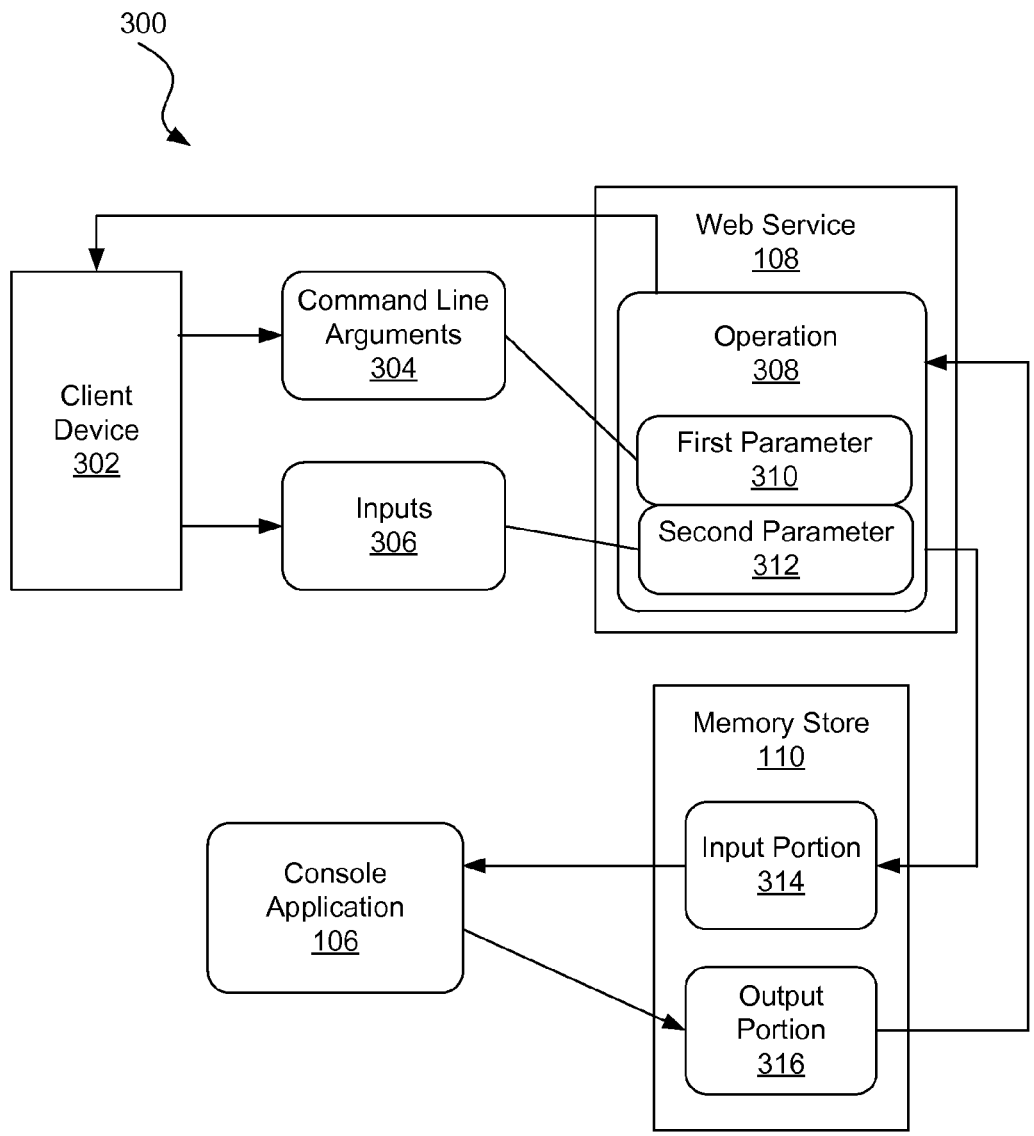
FIG. 3 is a diagram showing a console application provided through a web service, according to one example of principles described herein.

FIG. 3 is a diagram showing a console application 106 provided through a web service 108. According to the present example, a client device 302 accesses a web service 108 over a network such as the Internet. In one example, the client device accesses the web service 108 by entering a known Uniform Resource Locator (URL) into a web browser application. The web service 108 then provides the user with the mechanisms for interacting with the console application 106. Specifically, the web service 108 includes an operation 308 that accepts a first parameter 310 and a second parameter 312.

As mentioned above, the first parameter 310 corresponds to command line arguments 304. Thus, the operation may assume that the user of the client device 302 is familiar with the console application 106 and knows what command line arguments 304 are available. If the user does not wish to use any command line arguments 304, then the user may choose not to enter any data for the first parameter 310.

The second parameter 312 corresponds to inputs used for the console application 106. Again, it may be assumed that the user is familiar with the console application 106 and may know what inputs should be provided. In some cases, a console application 106 may accept multiple input values. In such cases, each input value may be separated by a new line. Thus, the web service 108 can readily parse the input values for the console application 106.

The web service 108 stores the inputs 306 into an input portion 314 of the memory store 110. As described above, the deployer module (e.g., 104, FIG. 1) designates a portion of the memory store for use with the console application 106. The console application 106 is then executed using the command line arguments received through the first parameter 310 of the operation 308. Additionally, as described above, the injection module (e.g. 112, FIG. 1) is used to change the input and output streams during runtime. Specifically, the injection module 112 will change the console streams to the memory location at which the inputs 306 are stored, in this case, the input portion 314 of the memory store 110. Thus, instead of looking to the console input stream for input, the console application 106 will look to the input portion 314 of the memory store 110.

The console application 106 will then execute instructions as normal. When the console application 106 sends data to the output stream, that data will be stored at a designated output portion 316 of the memory store 110 instead of the console output. The output portion 314 of the memory store 110 is available to the operation 308 of the web service. Thus, the web service 308 can provide the output data back to the client device 302. By doing so, the client device 302 is provided with access and use of the console application 106 without the console application 106 having to be reworked for remote deployment.

Figure 4:
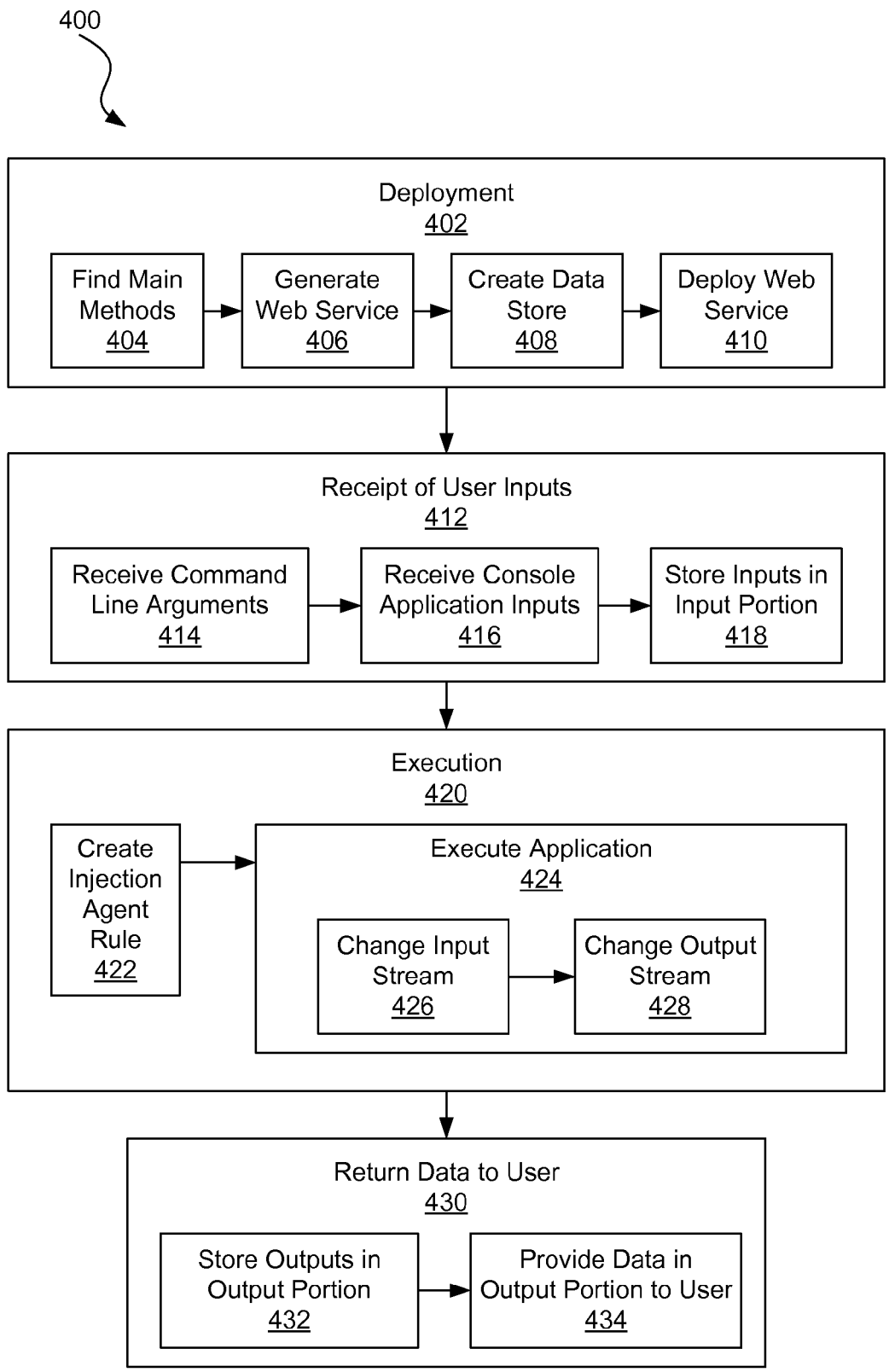
FIG. 4 is a flowchart showing a process for providing a console application through a web service to a remote user, according to one example of principles described herein.

FIG. 4 is a flowchart showing a process 400 for providing a console application through a web service to a remote user. According to the present example, the process 400 includes a deployment process 402, a receipt of user inputs process 412, an execution process 420, and a return data to user process 430. The process may utilize components described above in accordance with FIGS. 1-3.

According to the present example, the deployment process 402 includes a step 404 for finding all the main methods of a console application. As described above, this may be performed by a deployer module. The deployer module may analyze the console application, which is maintained in a JAR format, for the main methods. Various techniques can be used to find the main methods. For example, the java Application Programming Interface can include a reflection function that allows for examination of a software application. The Java reflection function can be used to find the main methods of a particular console application.

The deployment process 402 further includes a step 406 for generating a web service. Generating the web service involves creating an operation for each main method found in the console application. The operation of the web service includes two input parameters. The first input parameter corresponds to command line arguments. The second input parameter corresponds to a set of user inputs associated with the console application.

The deployment process 402 further includes a step 408 for allocating a portion of a data store or memory store for use by an instance of the console application. This may also be done by the deployer module. For example, a particular region of memory may be designated for use by the web service and the corresponding console application 106. The particular memory region may include sub-regions that correspond to specific instances of the console application 106 for specific users. Such sub-regions may remain allocated for a particular instance as long as that instance exists.

The deployment process 402 further includes a step 410 for deploying the web service. Thus, the web service is made available to remote users. In one example, the web service is a SOAP service that is accessible remotely over a network. Client systems can communicate with the application server associated with the web service and provide users with access to the web service. Through the web service, users may use the console application.

After the deployment process, the web service may receive user inputs as described in process 412. The receipt of user inputs process 412 includes a step 414 for receiving command line arguments from the user. The command line arguments may be received through a first parameter of the web service operation. As described above, it can be assumed that the user is familiar with the corresponding console application and is thus knowledgeable as to what command line arguments are available. For purposes of discussion, a simple example of a console application will be discussed. It is noted that the following example is for purposes of discussion. Practical implementations of principles described herein may involve more sophisticated console applications.

The example console application receives two input values representing numbers and outputs a mathematical operation on those numbers. The mathematical operation to be performed depends on the command line arguments received when executing the console application. In this example, the console application may be named Math. The available command line arguments are "sum" and "multiply". Thus, the user specifies either "sum" or "multiply" as the first input parameter of the web service operation.

The receipt of user inputs process 412 further includes a step 416 for receiving console application inputs. Continuing with the Math console application example, the inputs include the two numbers upon which the math operation is to be performed. For example, the inputs may be the number "3" and the number "8". The user provides these inputs to the web service. The web service operation applies these inputs as the second parameter.

The receipt of user inputs process 412 further includes a step 418 for storing the inputs in the input portion of the memory store. In one example, the two different inputs values are stored in a text (txt) file with each different input on a new line. Continuing the math example, the text file would include:
3
8
The text file can be stored in a location in memory that has been allocated to a specific instance of the console application.

After receipt of all the user inputs, the console application can be executed. The execution process 420 includes a step 422 for creating an injection agent rule. An injection agent such as Byteman may use specific rules that indicate when and where to inject specific code into a console application at runtime. The rule can assign the input and output streams to correspond to the memory locations assigned to a specific instance of the console application. For example, the input stream can be changed to the location at which the text file described above is stored in memory.

The execution process 420 includes a step 424 for executing the application. The web service calls the console application and causes execution of the console application with the command line arguments received from the user. For example, the user may provide the "sum" command line argument. Thus, the console application will execute using the "sum" command line argument. Additionally, the console application is executed with the injection agent such that the injection agent rule can be applied.

The execution of the console application 424 includes a step 426 for changing the input stream. As described above, the input stream is changed from the console input to a location in memory that has been designated as such. Additionally, the designated location includes the inputs as provided by the user through the web service operation. The execution of the console application 424 further includes a step 428 for changing the output stream. Specifically, the output stream is changed from the console output to a specified location in memory.

After execution 420 of the console application, the output of the console application is returned to the user in the return data to user process 430. The return data to user process 430 includes a step 432 for storing outputs in an output portion. Because the output streams were changed from the console output to the memory location output, the output of the console application is stored at that memory location. Continuing with the Math console application example, the output of the console application when using the "sum" command line argument and the values "3" and "8" as inputs results in an output of "11".

The return data to user process 430 further includes a step 434 for providing the data stored in the output portion of memory to the user. The web service may have access to this portion of memory as well. Thus, when the console application finishes execution, the web service will take the data stored at the output portion and provide that data to the user through the web service.

Figure 5:
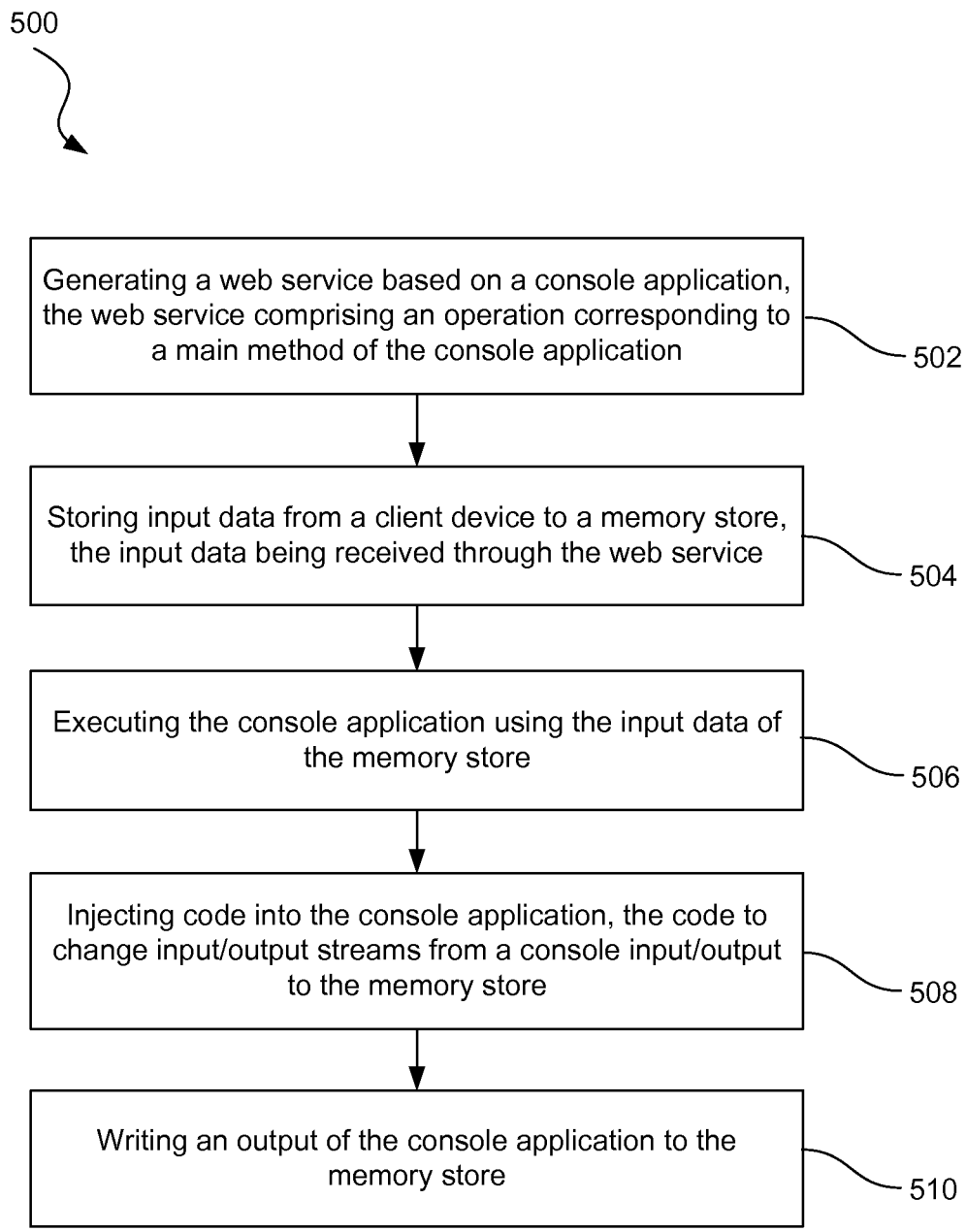
FIG. 5 is a flowchart showing an illustrative method for providing a console application, according to one example of principles described herein.

FIG. 5 is a flowchart showing an illustrative method 500 for providing a console application. According to the present example, the method 500 includes a step 502 for generating a web service based on a console application, the web service comprising an operation corresponding to a main method of the console application. The web service is based on the console application as the web service is designed to provide use of the console application to remote users. This is done without having to manually rework the source code of the console application. The operation corresponds to the main method as it receives command line arguments and inputs from the user, the command line arguments and inputs being specific to that console application.

The method 500 further includes a step 504 for storing input data from a client device to the memory store, the input data being received through the web service. As described above, the web service includes an operation that receives two input parameters. The first input parameter corresponds to the command line arguments and the second input parameter corresponds to the inputs that are to be received by the console application during runtime.

The method 500 further includes a step 506 for executing the console application using the input data of the memory store. Specifically, the console application is executed using the command line arguments and the inputs provided by the user. Multiple inputs may be separated by a new line.

The method 500 further includes a step 508 for injecting code into the console application. The code is designed to change input/output streams from a console input/output to a memory store. As described above, this can be done using an injection agent such as a Byteman agent.

The method 500 further includes a step 510 for writing an output of the console application to the memory store. The web service can then take the output data stored at the memory store and return that data to the client device, or user, that provided the inputs to the console application.

The method 500 described above may be performed by an application server 102 as described above in accordance with FIG. 1. In some examples, the application server may host multiple client devices that are seeking use of the console application. The web service may call a different instance of the console application for each client device seeking to use the console application. Each instance may have a corresponding space within the memory store at which to store input data and output data. Thus, the injection agent can change the streams for each instance to correspond to the proper location within the memory store.

Some examples of processing systems described herein may include non-transitory, tangible, machine readable media that include executable code that when run by one or more processors (e.g., processor 202) may cause the one or more processors to perform the processes of method 500 as described above. Some common forms of machine readable media that may include the processes of method 500 for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a server computing system, the method comprising:
   deploying a console application instance on an application server, wherein the application server creates an instance of a console application for each remote system that requests use of the console application;
   generating an operation for a web service, the web service providing use of the console application instance to a remote user, the operation corresponding to at least one main method of the console application instance;
   receiving input data from a client device through the operation;
   writing the input data to a memory store;
   executing the console application instance using the input data of the memory store;
   injecting code into the console application instance, the code to change input/output streams of the console application instance from a console input/output to a memory location input/output; and
   writing an output of the console application instance to the memory location input/output.

2. The method of claim 1, further comprising, through the operation, providing the output stored at the memory store to the client.

3. The method of claim 1, wherein the operation comprising two input parameters.

4. The method of claim 3, wherein a first input parameter comprises command line arguments from the client.

5. The method of claim 3, wherein a second input parameter comprises inputs for the console application instance.

6. The method of claim 5, wherein the inputs for the console application instance are separated by a new line.

7. The method of claim 5, where the inputs are provided by the remote user associated with the client device.

8. The method of claim 1, wherein injecting the code into the console application instance comprises using Byteman to inject the code.

9. The method of claim 1, wherein the memory store comprises one of: a file stored on a non-volatile memory device and a volatile memory store.

10. A system comprising:
an application server comprising:
a processor; and
a memory comprising machine readable instructions that when executed by the processor, cause the application server to:
analyze a console application instance for a main method and deploy a web service, wherein the console application instance is deployed on the application server, wherein the application server creates an instance of a console application for each remote system that requests use of the console application, the web service comprising an operation corresponding to the main method, wherein the web service provides use of the console application instance to a remote user;
provide the web service to a client device; and
inject code into the console application instance in response to the console application instance being called by the operation, the code to change input/output streams of the console application instance from a console input/output to a memory location input/output.

11. The system of claim 10, wherein the operation comprises two input parameters.

12. The system of claim 11, wherein the application server is to receive a first input parameter from the client device, the first input parameter comprising command line arguments for the console application instance.

13. The system of claim 11, wherein the application server is to receive a second input parameter from the client device, the second input parameter comprising inputs for the console application instance.

14. The system of claim 13, wherein the inputs for the console application instance are in a file format and separated by a new line.

15. The system of claim 11, wherein the input parameters are received from the remote user associated with the client device, the input parameters being received through the web service.

16. The system of claim 10, wherein the injection module comprises a code testing agent.

17. The system of claim 16, wherein the code testing agent comprises a Byteman agent.

18. A computer program product stored on a non-transitory computer readable medium, the computer program product comprising machine readable instructions, the machine readable instructions comprising:
code to deploy a console application instance on an application server, wherein the application server creates an instance of a console application for each remote system that requests use of the console application;
code to generate an operation for a web service, the web service providing use of the console application instance to a remote user, the operation corresponding to at least one main method of the console application instance;
code to receive input data from a client device through the operation, the input data comprising a first input parameter and a second input parameter;
code to store the first input parameter and the second input parameter to an input portion of a memory store;
code to create an output portion of the memory store;
code to create an injection rule for a main method of the console application instance, the injection rule to change console input of the console application instance to the input portion of the memory store and to change the console output of the console application instance to the output portion of the memory store;
code to execute the console application instance; and
code to provide data stored in the output portion of the memory store to the client device.

19. The computer program product of claim 18, wherein the first input parameter comprises command line arguments and the second input parameter comprises inputs for the console application instance.

20. The computer readable program product of claim 18, wherein the injection rule defines injection of code for a code testing agent.

* * * * *